United States Patent [19]

Baals et al.

[11] Patent Number: 5,392,337
[45] Date of Patent: Feb. 21, 1995

[54] ARRANGEMENT FOR VARYING THE DISPLAY TIME FOR MESSAGES DISPLAYABLE ON A TELEPHONE TERMINAL

[75] Inventors: Kimberly A. Baals, Matawan; Kathleen J. Chylinski, Bridgewater; Darren A. Kall, Highland Park; Gary C. Smith, Freehold; Susan L. Tuttle, East Windsor, all of N.J.

[73] Assignee: AT&T Corp., Murray Hill, N.J.

[21] Appl. No.: 428

[22] Filed: Jan. 4, 1993

[51] Int. Cl.⁶ .................... H04M 1/27; G09G 3/20
[52] U.S. Cl. .................... 379/96; 379/110; 379/356; 379/368; 379/396; 345/123
[58] Field of Search ............ 379/355, 356, 357, 368, 379/387, 388, 389, 396, 201, 96, 110, 111, 142; 340/712; 345/123, 124, 130, 146, 168, 169, 172, 902, 903

[56] References Cited

U.S. PATENT DOCUMENTS

| | | | |
|---|---|---|---|
| 4,293,855 | 10/1981 | Perkins | 340/712 |
| 4,644,339 | 2/1987 | Ruder | 345/130 |
| 4,776,002 | 10/1988 | Kammerl | 379/387 |
| 4,786,895 | 11/1988 | Castaneda | 345/123 |
| 4,794,386 | 12/1988 | Bedrij et al. | 345/123 |
| 4,841,454 | 6/1989 | Awazu | 345/123 |
| 4,860,339 | 8/1989 | D'Agosto, III et al. | 379/110 |
| 4,885,580 | 12/1989 | Noto et al. | 379/396 |
| 4,908,853 | 3/1990 | Matsumoto | 379/355 |
| 4,916,731 | 4/1990 | Brisson | 379/96 |
| 4,967,190 | 10/1990 | Fujisaki et al. | 340/712 |
| 5,067,150 | 11/1991 | Satomi et al. | 379/396 |

OTHER PUBLICATIONS

"Twin or Clone?, Inter-Tel's Magnificent Screens Come in Two Flavors" Teleconnect Aug. 1987.
Canon Navigator Desktop Office "The World's First Desktop Office is Here" Conar, Inc. 1990; Dec. 30, 1990.

Primary Examiner—James L. Dwyer
Assistant Examiner—Scott L. Weaver
Attorney, Agent, or Firm—Samuel R. Williamson

[57] ABSTRACT

A telephone terminal provides display screens of information messages which are selectively arranged to be time-specific in accordance with the complexity content of the information in each message. The amount of text in an information message, the complexity of words in the message and whether any user action should follow the text presented in the message are factors used in optimizing the duration of the display screens for the messages timed specific to their content. A plurality of user selectable options for the duration of the display screens also are available. These selectable options alter the duration time of all the display screens as a set. Within each selected set the variable time accorded each display screen, in accordance with the time-specfic information messages, provides for optimum viewing of each message by a user of the telephone terminal.

16 Claims, 3 Drawing Sheets

ARRANGEMENT FOR VARYING THE DISPLAY TIME FOR MESSAGES DISPLAYABLE ON A TELEPHONE TERMINAL

BACKGROUND OF THE INVENTION

1. Technical Field

This invention is directed to interactive display arrangements and more particularly to an apparatus and a method for enabling a user to vary the time of display for messages on such display arrangements.

2. Description of the Prior Art

Current trends in the design of telephone terminals indicate that more of telephone functionality increasingly is being integrated into the telephone display associated with the terminal. For example, information as to the features available on the display has migrated from LEDs to the display, and local additions such as directories, status information, incoming caller information, etc. are all migrating to the display.

By incorporating a display, which typically comprises alphanumeric characters, into a telephone terminal, a considerable amount of information may be conveyed to a user of the telephone terminal. Different users of a telephone terminal generally assimilate information at different rates, however. Also when a new user of a telephone terminal is becoming familiar with the features and options available at the terminal, he or she will assimilate the information provided in the telephone display at a different rate from that which he or she reads the information after some exposure to both the telephone terminal and the display.

Some current telephone terminals in the art employ displays that keep a screen of information static. In such a terminal, the information is retained on the screen until the user actuates a button or switch on the terminal for releasing the displayed information and advancing to the next screen of information. This type of display has the disadvantage or requiring the user to initiate a "move on" action on the telephone terminal. Other current telephone terminals in the art employ displays which present timed screens of information to a user. These timed screens of information, unfortunately, may appear too fast for the novice user and too slow for the experienced user of the telephone terminal.

SUMMARY OF THE INVENTION

The prior art problems are solved in accordance with the invention by providing an interactive display arrangement for enabling a user to control a telephone display which provides screens of information messages on a telephone terminal.

In accordance with one aspect of the invention, the length of time for the presentation of the display screens is a variable which is controllable by a user of the telephone terminal. The user of the terminal is thus able to set the length of time for presentation of a display message appropriate to the rate at which he or she desires without having to prompt the screen to move on to the next screen or, conversely, without having to stop the screen from moving on to the next screen.

In accordance with another aspect of the invention, the display screens are selectively arranged to be time-specific in accordance with the contents of the display message. Duration options available to a user are advantageously obtained based upon the complexity of the text presentation and also whether any user action should follow the text presentation provided in a particular display screen.

BRIEF DESCRIPTION OF THE DRAWING

This invention and its mode of operation will be more clearly understood from the following detailed description when read with the appended drawing in which.

DETAILED DESCRIPTION

Figure 1:
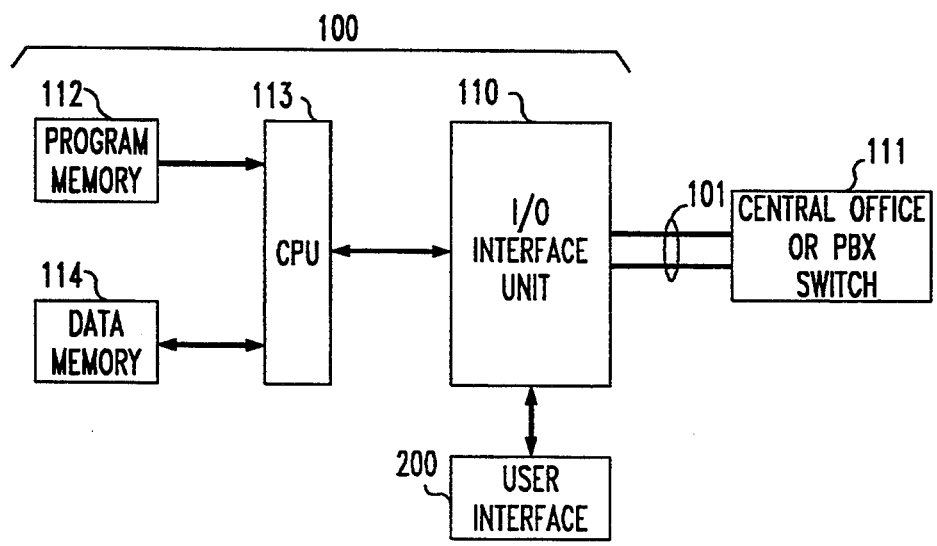
FIG. 1 is a block diagram of a telephone terminal useful in describing the present invention.

Referring now to FIG. 1, there is shown an illustrative block diagram of a telephone terminal 100 useful for describing the operation of the present invention. The terminal includes an input/output (I/O) interface unit 110 which connects to a telecommunication switch 111, such as the 5ESS ® central office (CO) switch or the DEFINITY ® private branch exchange (PBX) switch, via lines 101. This I/O interface unit 110 contains switching, control, and line circuits required by the terminal 100 for establishing, maintaining and terminating communication connections between the terminal and the CO or PBX switch 111. Through these circuits, the terminal 100 thus sends to and receives from the CO or PBX switch 111 switching and control signals.

The terminal also includes a program memory 112 which provides instructions to a central processor unit (CPU) 113 for controlling the various operating features and functions originating at the terminal. This program memory 112 also contains data for interpreting a plurality of codes representative of various network information received from the switch 111 and for generating codes to be transmitted to the switch 111. A data memory 114 is utilized by the CPU 113 for storing and accessing data associated with performing the various functions and features programmed in the program memory 112. In one embodiment, CPU 113 is a microprocessor, program memory 112 is read-only-memory (ROM) and data memory 114 is a random-access-memory (RAM). These components are readily available from a number of semiconductor manufacturers such as Intel, Motorola, AMD and NEC. Connected to the interface unit 110 is a user interface 200, the physical aspects of which are shown in greater detail in FIG. 2.

Figure 2:
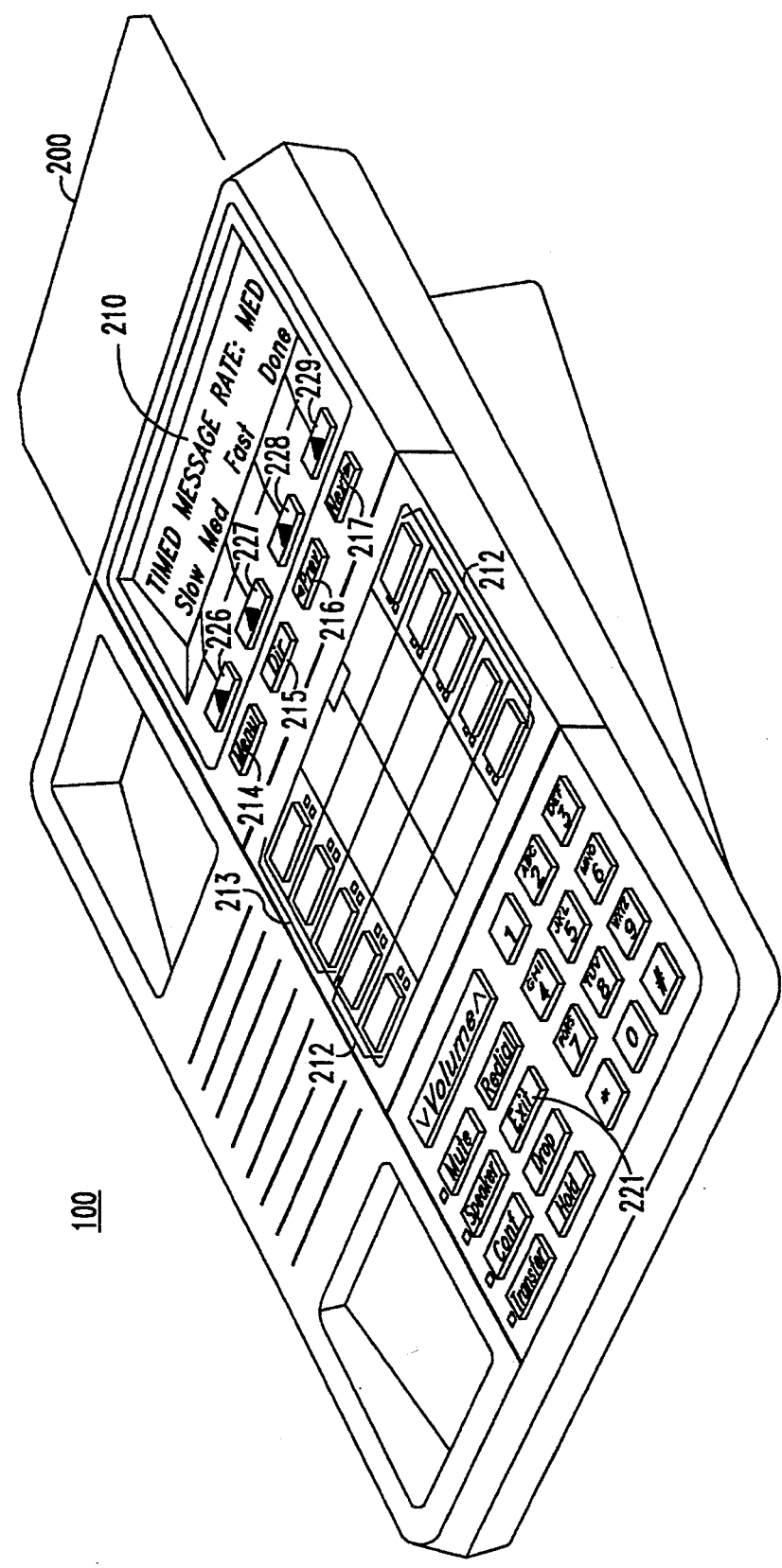
FIG. 2 illustrates the telephone terminal of FIG. 1 including a user interactive display, in accordance with the present invention.
Figure 4:
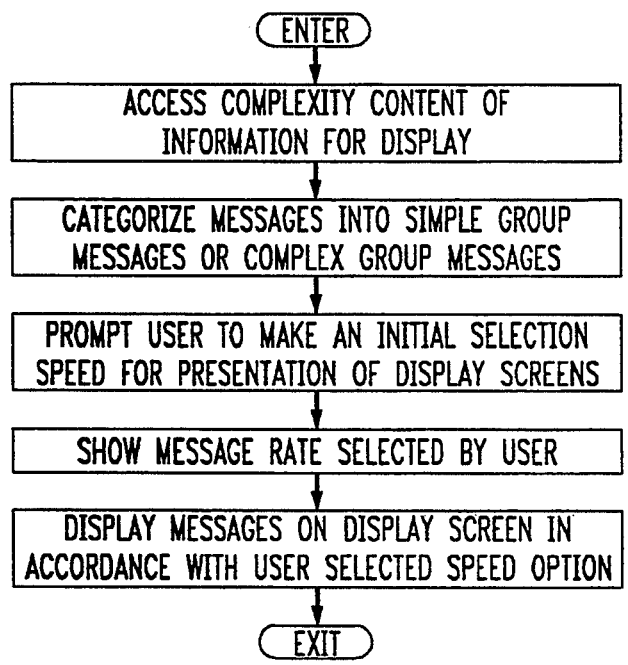
FIG. 4 is a flow diagram of the invention model.
Figure 5:
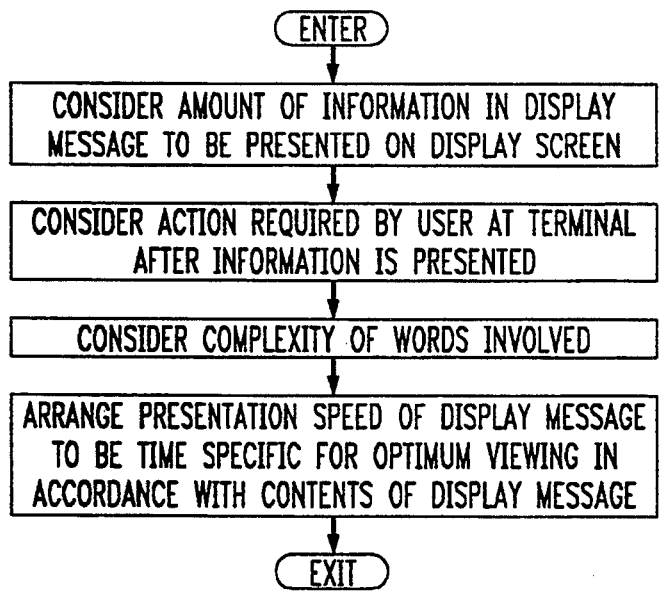
FIG. 5 is a flow diagram of a procedure for optimizing presentation speeds of screen information.

With reference to FIG. 2, and in accordance with the invention, the user interface 200 allows a user of the telephone terminal 100 to access an interactive telephone display 210 for controlling the way in which this display provides screens of information messages for a telephone terminal. The interface 200 also allows the user of the telephone terminal 100 to access local and network-based features at the terminal.

The user interface 200 comprises the user interactive display 210, switch administered keys or buttons 212, call appearance keys or buttons 213, multiple hard keys 214 through 217, an "Exit" key 221 and softkeys 226 through 229. Other well-known keys or buttons also are illustrated as part of the telephone terminal shown in FIG. 2 but are not further described herein.

The multiple hard buttons 214 through 217 are respectively labeled "Menu", "Dir", "<Prev", and "Next>". The Menu button 214 is used to configure the terminal to the local softkey state. Similarly, the Dir button 215 also configures the terminal to the local softkey state, and also gives the user quick access to a local directory stored in the terminal with the first few entries appearing on the display. The <Prev and Next> buttons 216 and 217 are used to access additional menu items in both the local softkey state and in a network-based or switch feature state. In the local softkey state, for example, names and telephone numbers may be entered into a personal directory (not shown) or this directory may be accessed by these buttons for editing with the softkeys 226 through 229. Also the next button 217 could be used in the switch feature state, for example, to display the next entry in the directory query feature.

The labels and functions of the softkeys 226 through 229 appear on the associated display 210. The label or function for each of these keys changes dynamically as the user performs functions and makes selections via these softkeys.

While the embodiment of the present invention is described as being incorporated into a telephone terminal, it should be recognized that the present command-operated terminal could be utilized in a computer or other program-controlled system. Since such systems utilize a variety of hardware and programming techniques, no attempt is made to describe the details of the program used to control the telephone terminal. However, the present invention must be blended into the overall structure of the system in which it is used and must be tailored to mesh with other features and operations of the system. Thus, in order to avoid confusion and in order to enable those skilled in the art to practice the claimed invention, this specification describes the operation of the present invention using the telephone terminal 100 shown in both FIGS. 1 and 2 together with the interactive display 210 of FIG. 2 and the interactive display 210' of FIG. 3 which, taken together, describe the logical steps and the various parameters required to implement the present invention.

The length of time for the presentation of the display screens on the display 210 is a variable which is controllable by a user of the telephone terminal, in accordance with the invention. Thus the user of the terminal is able to set the length of time for presentation of a display message appropriate to the rate at which he or she desires without having to prompt the screen to move on to the next screen or, conversely, without having to stop the screen from moving on to the next screen.

Control over the length of time for the presentation of the display message is provided as a softkey option in the telephone terminal. In accordance with the invention, the user has the option to select one of, for example, three presentation speeds, illustrated as "Slow", "Med" and "Fast" in the display 210 of FIG. 2. In the process of selecting a presentation speed, the user presses one of the softkey buttons 226, 227 or 228 which respectively corresponds to presentation speeds of Slow, Med or Fast in accordance with the rate at which he or she wants the display messages to be shown. Once the appropriate softkey button from the group 226 through 228 is pressed, the display screen shows the display message rate selected in the right portion on the upper line in the display. Lastly, the selection process is completed by the user pressing the softkey button 229 below the word "Done".

The user selectable speed options alter the presentation speed of screen information as a set. i.e., selecting a presentation speed changes the length of time for presentation of all timed information screens. Within the set, however, and in further accordance with the invention, the presentation speed of the display messages comprising the screen information is arrangeable to be time specific for optimum viewing by a user of the telephone terminal in accordance with the contents of the display message.

Figure 3:
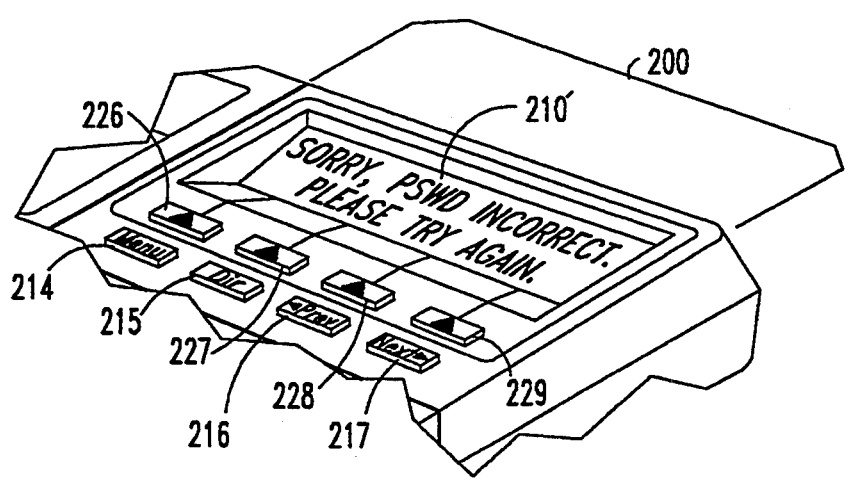
FIG. 3 illustrates the telephone terminal of FIG. 1 with a timed display message.

A number of procedures are employed in optimizing the presentation speed of the screen information, in accordance with the invention. In a first optimization, text complexity is considered. The text complexity is determined by 1) the amount of information in a display message presented on the screen, 2) any action required by the user at the terminal after presenting the information, and 3) the complexity of words involved. Shown in the display screen 210' of FIG. 3 is, for example, a display message of screen information that requires the user to take some action after the information is presented.

The total set of messages are advantageously separated into, for example, two groups, simple and complex. It is to be understood that although only two groups are selected and illustrated herein, the principles are applicable to other than this specific number and such teaching is intended.

In the process of determining appropriate times for presentation of the display screens, certain procedures are implemented and followed. By way of example, screens with more words, those suggesting a user action should follow, or those containing complex (technical) words, are seen as more complex than those with fewer words, those having no suggestion for action, and those containing simple words or language. Within this framework, messages are categorized and the three speeds, Slow, Med and Fast, for each group of messages are selected. Empirical results show that optimum times for the simple group messages employed in the display 210 are Fast=2 seconds, Med=4 seconds, and Slow=8 seconds. And the optimum times for the complex group messages are Fast=3 seconds, Med=5 seconds, and Slow=9 seconds. Thus, in accordance with the invention, the display times for both the simple and complex group messages are advantageously determined for the user without the need for direct knowledge by the user of the complexity of the text of the information being presented in the display screens. As a result, the user, after making an initial selection display speed, is generally able to use the telephone terminal easier and more fully very quickly. As the user becomes more familiar with the operation of the terminal, he or she also is able to adjust the display in accordance with his or her needs. In addition, a user may elect to exit the timed information screen display process by pressing any softkey button.

The model for the invention may be stated thusly: 1) assess complexity content of information to be displayed modified by technology of display; 2) optimize variable timed displays with sample users; and 3) install control of variable time in either discrete or continuous ranges in an appropriate number of steps to cover the results of the sample users needs.

Other models are expected to become known to those skilled in the art. Such models may be utilized without departing from the spirit and scope of the present invention. By way of example, the usable selectable presentation screen speed options may be configured to be selectable on a message by message basis thereby allowing users the advantage of adjusting specific messages for their needs.

Any embodiments of devices that display information messages and have the potential for the text in the information message being generated faster than people can read such text could employ the present invention. Applications directed to telephones, photocopy machines, computers, visual pagers, automatic teller machines, calculators, electronic tickertapes, video games or other user interactive arrangements other than the disclosed arrangement are contemplated as being within the knowledge of one skilled in the art.

We claim:

1. A method of displaying screens of information messages in a display device at a telephone terminal connectable to a telecommunication switch, the method comprising the steps of:
   generating in the telephone terminal a set of information messages, the information messages varying in amount of textual contents;
   preselecting by a user of the telephone terminal one of selectable time periods for determining a length of time of display for each of the information messages on a screen of the display device; and
   controlling in the telephone terminal the user preselected time period for which each of the information messages is displayed on the screen of the display device, said controlling step varying the user preselected time period for displaying each of said information messages for a period of time determined in accordance with the amount of the textual contents of each of the information messages.

2. The method of claim 1 further comprising the step of displaying each of the information messages grouped according to the amount of the textual contents of each of the information messages, a first set of the information messages having a first amount of textual words being grouped together and a second set of the information messages having a second amount of textual words being grouped together, said second amount of textual words being fewer than said first amount of textual words.

3. The method of claim 2 further comprising the steps of displaying said first set of the information messages for a first time period and said second set of the information messages for a second time period, said first time period being longer than said second time period.

4. The method of claim 1 wherein the controlling step further comprises the step of selectively displaying each of the information messages for a period of time determined in accordance with specific textual contents of each of the information messages.

5. The method of claim 4 further comprising the step of displaying each of the information messages grouped according to said specific textual contents of each of the information messages, a first set of the information messages having predetermined complex words being grouped together in said first set of the information messages and a second set of the information messages having predetermined simple words being grouped together in said second set of the information messages, said complex words being predetermined to be more complex than said simple words.

6. The method of claim 5 further comprising the steps of displaying said first set of the information messages for a first time period and said second set of the information messages for a second time period, said first time period being longer than said second time period.

7. The method of claim 6 wherein the controlling step further includes the step of variably controlling the first and second time periods, said variably controlling step providing a plurality of third and fourth proportioned time periods respectively selectable as the first and second time periods.

8. The method of claim 7 wherein each one of the plurality of third time periods is associated with one of the plurality of fourth time periods, the associated one of the plurality of third time periods being longer than the associated one of the plurality of fourth time periods.

9. An arrangement for displaying screens of information messages in a display device at a telephone terminal connectable to a telecommunication switch, the arrangement comprising;
   means for generating a set of information messages in the telephone terminal, the information messages varying in amount of textual contents;
   means for a user preselecting at the telephone terminal one of selectable time periods for determining a length of time of display for each of the information messages on a screen of the display device; and
   means in the telephone terminal for controlling the user preselected time period for which each of the information messages is displayed on the screen of the display device, said controlling means varying the user preselected time period for displaying each of said information messages for a period of time determined in accordance with the amount of the textual contents of each of the information messages.

10. The arrangement of claim 9 further comprising means for displaying each of the information messages grouped in accordance with the amount of the textual contents each of the information messages, a first set of the information messages having a first amount of textual words being grouped together and a second set of the information messages having a second amount of textual words being grouped together, said second amount of textual words being fewer than said first amount of textual words.

11. The arrangement of claim 10 further comprising means for displaying said first set of the information messages for a first time period and said second set of the information messages for a second time period, said first time period being longer than said second time period.

12. The arrangement of claim 9 wherein the controlling means further includes means for selectively displaying each of the information messages for a period of time determined in accordance with specific textual contents of each of the information messages.

13. The arrangement of claim 12 further comprising means for displaying each of the information messages grouped in accordance with said specific textual contents of each of the information messages, a first set of the information messages having predetermined complex words being grouped together in said first set of the information messages, and a second set of the information messages having predetermined simple words being grouped together in said second set of the information messages, said complex words being predetermined to be more complex than said simple words.

14. The arrangement of claim 13 further comprising means for displaying said first set of the information messages for a first time period and said second set of the information messages for a second time period, said first time period being longer than said second time period.

15. The arrangement of claim 14 wherein the controlling means further includes means for variably controlling the first and second time periods, said variably controlling means providing a plurality of third and fourth proportioned time periods respectively selectable as the first and second time periods.

16. The arrangement of claim 15 wherein each one of the plurality of third time periods is associated with one of the plurality of fourth time periods, the associated one of the plurality of third time periods being longer than the associated one of the plurality of fourth time periods.

* * * * *